(12) United States Patent
Tanabe et al.

(10) Patent No.: US 12,401,237 B2
(45) Date of Patent: Aug. 26, 2025

(54) MOTOR, BLOWER, AND REFRIGERATOR

(71) Applicant: Panasonic Intellectual Property Management Co., Ltd., Osaka (JP)

(72) Inventors: Yuichi Tanabe, Osaka (JP); Masahiko Morisaki, Osaka (JP); Masatomo Kumashiro, Osaka (JP); Toshifumi Tsutsumi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1030 days.

(21) Appl. No.: 16/626,583

(22) PCT Filed: Jul. 13, 2018

(86) PCT No.: PCT/JP2018/026438
§ 371 (c)(1),
(2) Date: Dec. 26, 2019

(87) PCT Pub. No.: WO2019/021854
PCT Pub. Date: Jan. 31, 2019

(65) Prior Publication Data
US 2020/0119599 A1    Apr. 16, 2020

(30) Foreign Application Priority Data
Jul. 28, 2017   (JP) .................. 2017-145991

(51) Int. Cl.
*H02K 1/14*     (2006.01)
*F04D 25/06*    (2006.01)
(Continued)

(52) U.S. Cl.
CPC .............. *H02K 1/14* (2013.01); *F04D 25/06* (2013.01); *F25D 17/06* (2013.01); *H02K 1/18* (2013.01); *H02K 11/0094* (2013.01)

(58) Field of Classification Search
CPC ........ H02K 1/14; H02K 1/18; H02K 11/0094; H02K 2211/03; H02K 3/524; H02K 5/08;
(Continued)

(56) References Cited

U.S. PATENT DOCUMENTS 3,963,949 A * 6/1976 Church ................ H02K 15/022
                                                      310/43
4,071,787 A * 1/1978 Lautner .................. H02K 1/143
                                                      310/154.11
(Continued)

FOREIGN PATENT DOCUMENTS

CN   202978463 U    6/2013
EP      565312 A2  10/1993
(Continued)

OTHER PUBLICATIONS

Indian Examination Report dated Feb. 10, 2022 for the related Indian Patent Application No. 202047002548.
(Continued)

*Primary Examiner* — Ahmed Elnakib
(74) *Attorney, Agent, or Firm* — Rimon P.C.

(57) ABSTRACT

A motor includes: a bobbin having an insertion hole; a coil wound around the bobbin; a stator core having an excitation part that is inserted into the insertion hole; a rotor that is disposed rotatably with respect to the stator core; and a resin mold covering the bobbin, the coil, and the stator core. On a first opening end of the insertion hole, an exposed portion having an exposed surface that is exposed from the resin mold is formed. The exposed portion is positioned between the stator core and the resin mold.

17 Claims, 13 Drawing Sheets

(51) Int. Cl.
*F25D 17/06* (2006.01)
*H02K 1/18* (2006.01)
*H02K 11/00* (2016.01)

(58) Field of Classification Search
CPC ........ H02K 5/225; H02K 1/143; F04D 25/06; F25D 17/06; F25D 2317/0681; F25D 17/062
USPC .............................................. 310/43; 417/352
See application file for complete search history.

(56) References Cited

U.S. PATENT DOCUMENTS

| | | | | |
|---|---|---|---|---|
| 4,132,913 | A * | 1/1979 | Lautner | H02K 11/25 310/43 |
| 4,482,832 | A * | 11/1984 | Minton | H02K 17/10 310/216.034 |
| 4,600,864 | A * | 7/1986 | Sato | H02K 29/08 318/400.41 |
| 5,130,591 | A * | 7/1992 | Sato | H02K 17/10 310/187 |
| 6,069,428 | A * | 5/2000 | Nelson | H02K 11/33 310/90 |
| 6,348,752 | B1 * | 2/2002 | Erdman | H02K 1/2781 310/90 |
| 6,414,408 | B1 * | 7/2002 | Erdman | H02K 1/278 310/216.023 |
| 6,982,532 | B2 * | 1/2006 | Mullin | H02K 5/225 318/400.41 |
| 7,687,965 | B2 * | 3/2010 | Ionel | H02K 1/141 310/216.037 |
| 2006/0061224 | A1 | 3/2006 | Mullin et al. | |
| 2011/0223045 | A1 | 9/2011 | Sasaki et al. | |
| 2014/0300226 | A1 * | 10/2014 | Chang | H02K 1/148 310/71 |
| 2015/0061446 | A1 * | 3/2015 | Hidaka | H02K 15/03 310/156.43 |
| 2015/0137637 | A1 * | 5/2015 | Jang | H02K 3/522 29/598 |
| 2016/0138598 | A1 | 5/2016 | Park et al. | |
| 2016/0197530 | A1 * | 7/2016 | Fujii | H02K 11/33 310/71 |
| 2020/0119599 | A1 * | 4/2020 | Tanabe | H02K 1/14 |
| 2020/0336046 | A1 * | 10/2020 | Shimokawa | H02K 1/2746 |

FOREIGN PATENT DOCUMENTS

| | | |
|---|---|---|
| JP | 61-120252 U | 7/1986 |
| JP | 5-050959 U | 7/1993 |
| JP | 6-098491 A | 4/1994 |
| JP | 11-148484 | 6/1999 |
| JP | 2011-147264 | 7/2011 |
| WO | 2011/111317 A2 | 9/2011 |

OTHER PUBLICATIONS

English Translation of Chinese Search Report dated May 12, 2021 for the related Chinese Patent Application No. 201880048697.6.
Extended European Search Report dated Jun. 18, 2020 for the related European Patent Application No. 18837186.8.
International Search Report of PCT application No. PCT/JP2018/026438 dated Oct. 2, 2018.
English Translation of Chinese Search Report dated Sep. 5, 2022 for the related Chinese Patent Application No. 201880048697.6.

* cited by examiner

MOTOR, BLOWER, AND REFRIGERATOR

CROSS-REFERENCE TO RELATED APPLICATIONS

This application is a U.S. national stage application of the PCT International Application No. PCT/JP2018/026438 filed on Jul. 13, 2018, which claims the benefit of foreign priority of Japanese patent application 2017-145991 filed on Jul. 28, 2017, the contents all of which are incorporated herein by reference.

TECHNICAL FIELD

This disclosure relates to a motor, a blower, and a refrigerator. Particularly, this disclosure relates to a motor for driving an impeller of a blower which is mounted in a refrigerator.

BACKGROUND ART

The motor is used in various kinds of electric equipment. For example, the motor is used in a blower mounted in a refrigerator or the like. The motor used in the blower includes a stator, and a rotor which is rotated by the stator, for example. The rotor has a shaft which forms a center of rotation of the rotor. The blower further includes an impeller which is mounted on the shaft of the rotor, and supplies air by rotating the rotor using the stator.

FIG. 19 is a cross-sectional view of conventional blower 100 disclosed in PTL 1.

FIG. 19 shows conventional blower 100 disclosed in PTL 1. In conventional blower 100, a motor includes rotor 101, stator core 102 for rotating rotor 101, coil 104 which is wound around teeth portions (excitation parts) of stator core 102 by way of bobbin 103, and circuit board 105 on which electronic parts for controlling the supply of electricity to coil 104 is mounted.

Bobbin 103, coil 104, circuit board 105, and a portion of stator core 102 disposed around bobbin 103, coil 104, and circuit board 105 are covered by resin mold 106. Impeller 107 is mounted on shaft 108 of rotor 101. In blower 100, impeller 107 is rotated in an interlocking manner with the rotation of rotor 101, so that air is sucked into a casing as indicated by an arrow in FIG. 19. Air sucked into the casing is discharged from the casing through a discharge port formed on a left side of the casing in the drawing. With such a configuration, blower 100 can supply air.

However, in the configuration of the conventional motor, there is a possibility that water intrudes into the motor from a boundary between the stator core and the resin mold, and the water reaches the coil which is covered by the resin mold thus giving rise to a concern that a layer short of the coil occurs.

CITATION LIST

Patent Literature

PTL 1: Unexamined Japanese Patent Publication No. H11-148484

SUMMARY

This disclosure is made to overcome the above-mentioned drawback. It is an object of the present disclosure to provide a motor or the like which can suppress the occurrence of a layer short of a coil which is covered by a resin mold.

To achieve the above-mentioned object, according to an aspect of this disclosure, a motor includes: a bobbin having an insertion hole; a coil wound around the bobbin; a stator core having an excitation part that is inserted into the insertion hole; a rotor disposed rotatably with respect to the stator core; and a resin mold covering the bobbin, the coil, and the stator core. On a first opening end of the insertion hole, an exposed portion having an exposed surface that is exposed from the resin mold is formed. The exposed portion is positioned between the stator core and the resin mold.

According to another aspect of the present disclosure, a blower includes: a motor; and an impeller mounted on a shaft of a rotor.

According to another aspect of the present disclosure, a refrigerator includes: a blower; a control unit configured to control the blower; and a refrigerating compartment or a freezing compartment, wherein the blower is configured to supply cool air to the refrigerating compartment or the freezing compartment.

With the configuration of the present disclosure, the occurrence of a layer short of a coil covered by a resin mold can be suppressed.

DESCRIPTION OF PREFERRED EMBODIMENTS

Figure 1:
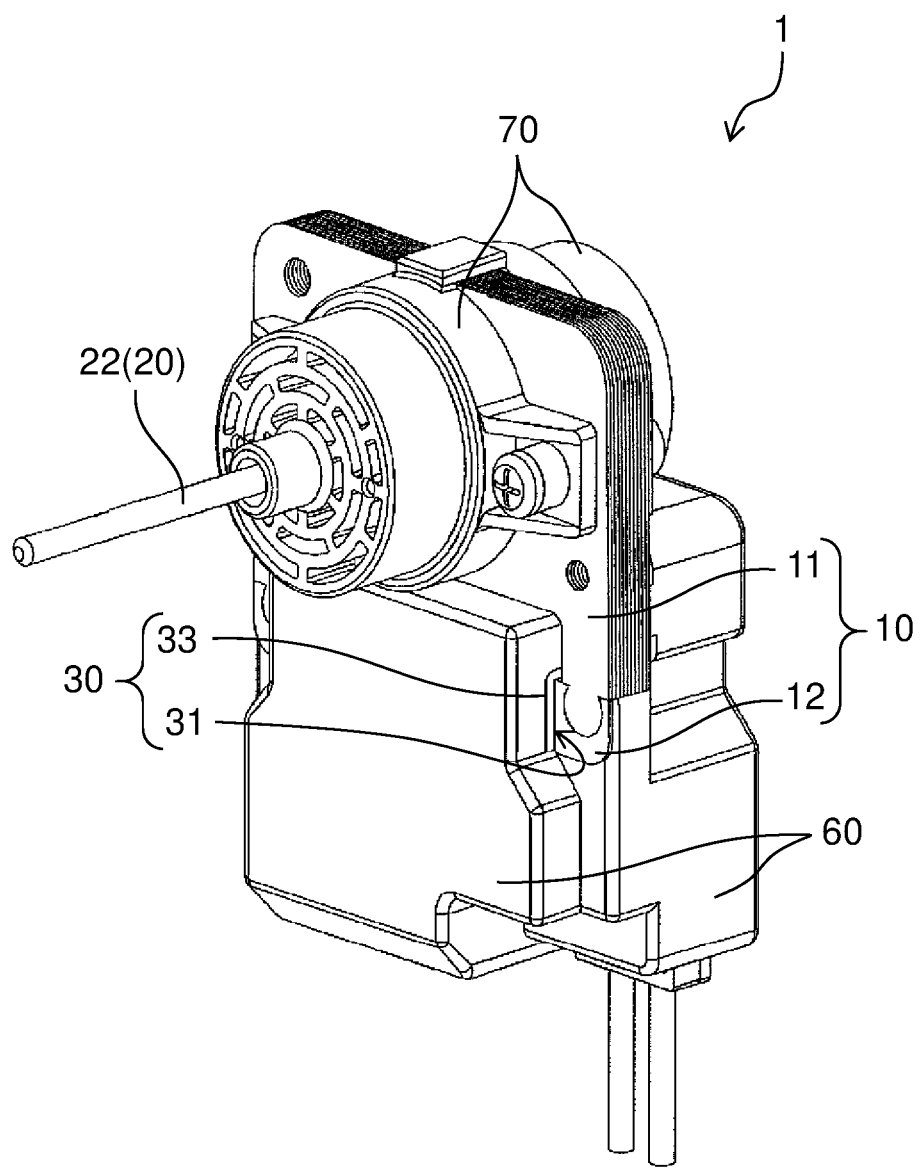
FIG. 1 is an external perspective view of a motor according to a first exemplary embodiment.

Exemplary embodiments of the present disclosure are described with reference to the drawings hereinafter. The exemplary embodiments described hereinafter show preferred specific examples of the present disclosure. Therefore, numeric values, shapes, materials, constitutional elements, arrangement positions and connection modes of the constitutional elements and the like which shown in the following exemplary embodiments are merely examples, and are not intended to limit the present disclosure. Further, out of the constitutional elements in following exemplary embodiments, the constitutional elements which are not described in independent claims describing an uppermost concept of the present disclosure are described as optional constitutional elements.

The drawings are schematic views and are not always exactly illustrated. In the drawings, substantially identical constitutional elements are given the same symbols, and the repeated description is omitted or simplified as appropriate.

First Exemplary Embodiment

Figure 2:
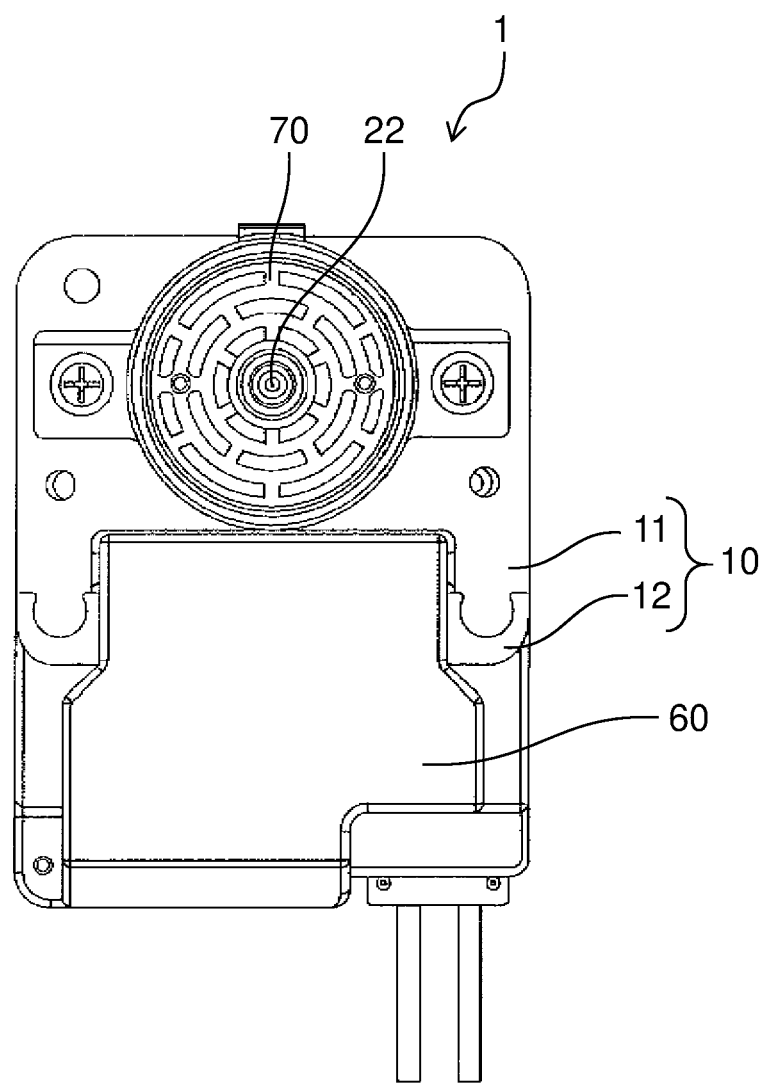
FIG. 2 is a front view of the motor according to the first exemplary embodiment.
Figure 3:
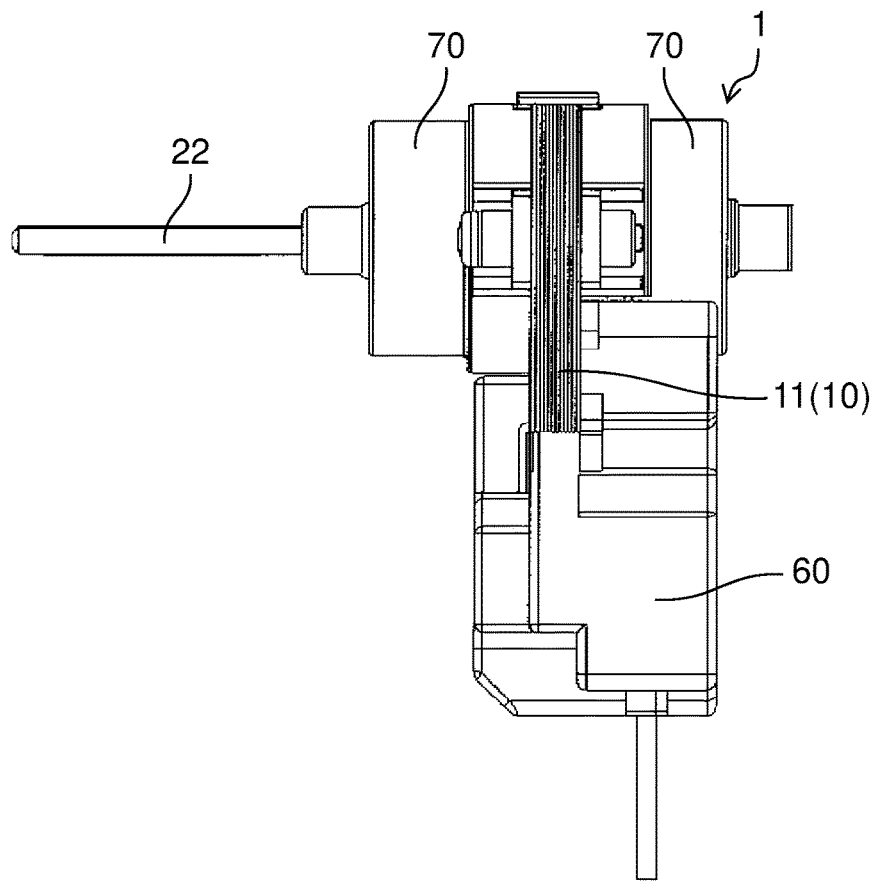
FIG. 3 is a side view of the motor according to the first exemplary embodiment.
Figure 4:
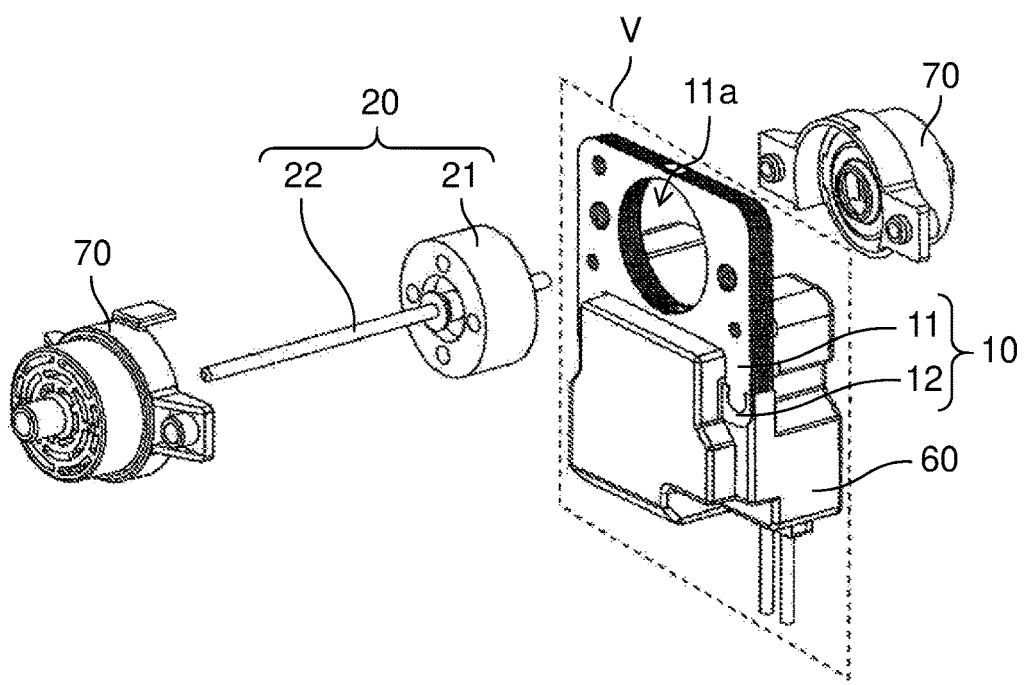
FIG. 4 is an exploded perspective view of the motor according to the first exemplary embodiment.
Figure 5:
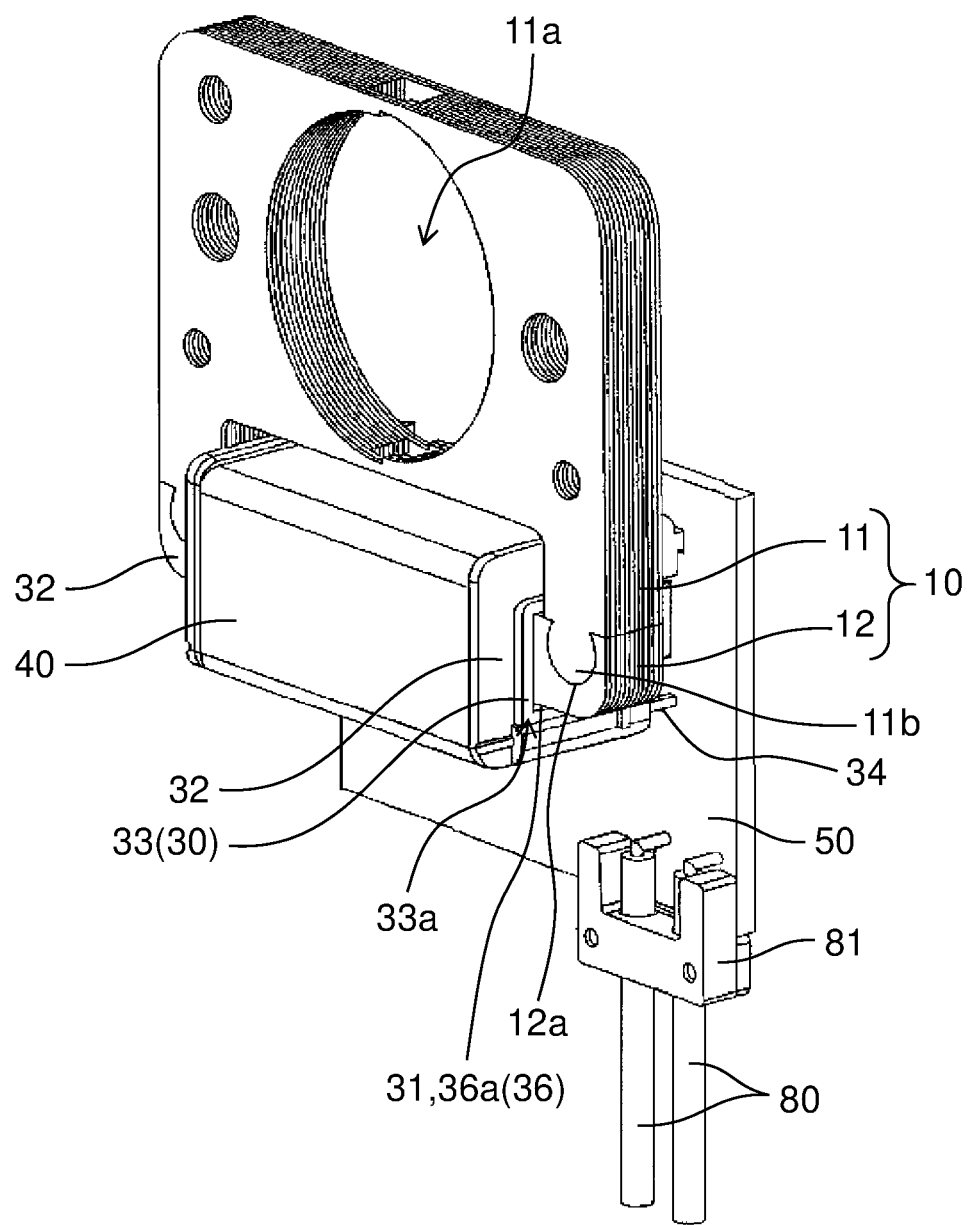
FIG. 5 is a view showing a state where a resin mold of the motor in region V surrounded by a broken line in FIG. 4 is omitted.
Figure 6:
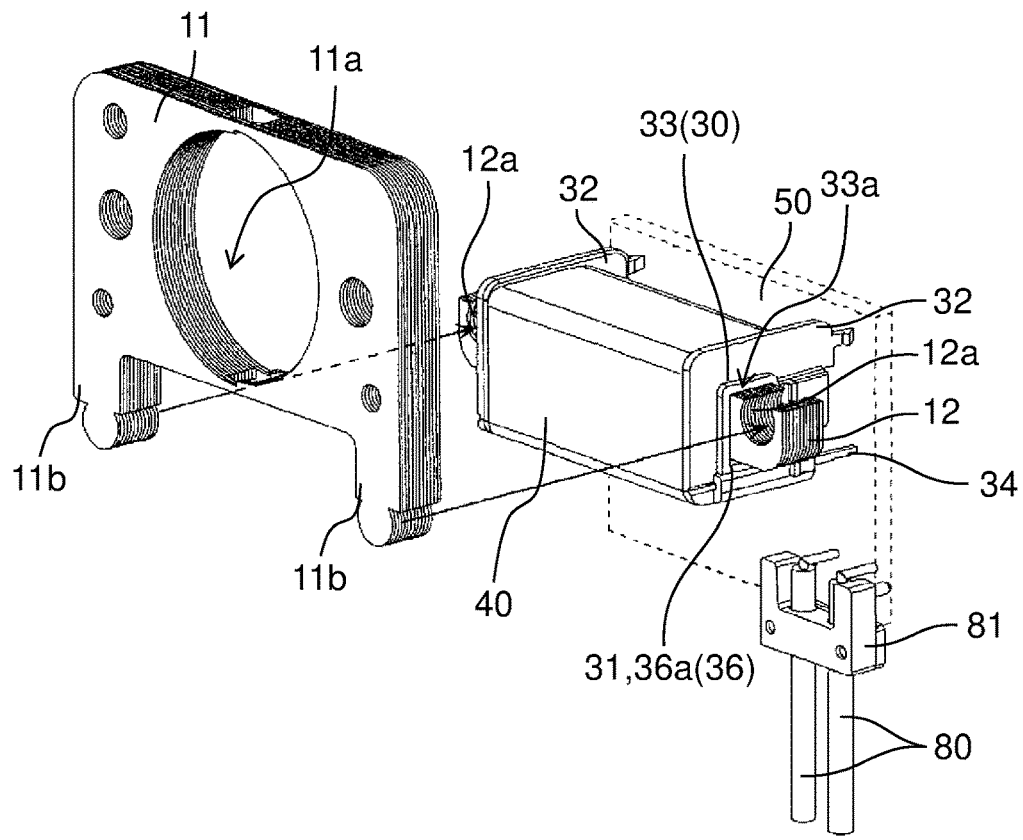
FIG. 6 is a view showing a state where a stator core in FIG. 5 is disassembled into a first segment core and a second segment core.

Motor 1 according to a first exemplary embodiment is described with reference to FIG. 1 to FIG. 6. FIG. 1 is an external perspective view of motor 1 according to the first exemplary embodiment. FIG. 2 is a front view of motor 1 according to the first exemplary embodiment. FIG. 3 is a side view of motor 1 according to the first exemplary embodiment. FIG. 4 is an exploded perspective view of motor 1 according to the first exemplary embodiment. FIG. 5 is a view showing a state where resin mold 60 of motor 1 in region V surrounded by a broken line in FIG. 4 is omitted. FIG. 6 is a view showing a state where stator core 10 in FIG. 5 is disassembled into first segment core 11 and second segment core 12. In FIG. 5 and FIG. 6, coil 40 is shown as an integral body. In FIG. 6, circuit board 50 is shown by a broken line.

As shown in FIG. 1 to FIG. 6, motor 1 according to this exemplary embodiment includes: stator core 10; rotor 20 which is disposed rotatably with respect to stator core 10; bobbin 30 having insertion hole 31; coil 40 wound around bobbin 30; circuit board 50; resin mold 60; and bearing unit 70.

Stator core 10 is an iron core which forms a stator for generating a magnetic force for rotating rotor 20. In this exemplary embodiment, stator core 10 includes: first segment core 11; and second segment core 12 which is connected to first segment core 11. First segment core 11 and second segment core 12 are each formed of a laminated body formed by laminating a plurality of (for example, twelve) electromagnetic steel plates. However, the present disclosure is not limited to such a configuration, and first segment core 11 and second segment core 12 may be a bulk body formed of a magnetic material.

First segment core 11 is formed so as to surround rotor 20. To be more specific, as shown in FIG. 5 and FIG. 6, first segment core 11 has fitting hole 11a into which rotor 20 is inserted by fitting. A shape of fitting hole 11a as viewed in a plan view is substantially a circular shape. First segment core 11 may be formed of a pair of segment cores which are split in two in a lateral direction.

First segment core 11 has legs lib. In this exemplary embodiment, first segment core 11 has two legs lib. Two legs lib are formed in a downwardly protruding manner from both ends of first segment core 11 in a width direction in the drawing (FIG. 6).

Second segment core 12 has recesses 12a which are connected to distal ends (connecting portions) of legs 11b of first segment core 11. In this exemplary embodiment, two recesses 12a are provided at positions corresponding to legs lib of first segment core 11. Recesses 12a of second segment core 12 and distal ends of legs lib of first segment core 11 have shapes which allow fitting engagement between recesses 12a and the distal ends. That is, recesses 12a and the distal ends have circular shapes as viewed in a plan view, for example.

Second segment core 12 is an elongated I-shaped core. As described later, coil 40 is wound around second segment core 12 by way of bobbin 30. Second segment core 12 is inserted into insertion hole 31 of bobbin 30 as an excitation part of stator core 10.

Rotor 20 is a rotor which rotates due to a magnetic force of stator core 10, and is surrounded by stator core 10. Rotor 20 is disposed in fitting hole 11a of first segment core 11 of stator core 10 rotatably. A minute air gap exists between an outer surface of rotor 20 and an inner surface of fitting hole 11a of stator core 10.

Rotor 20 shown in FIG. 4 is formed of one set of an N pole and an S pole along a rotational direction of rotor 20. As one example, rotor 20 is formed of: rotor body 21 which is formed by molding a plastic magnet material into a cylindrical shape; and shaft 22 which penetrates a center of rotor body 21.

Rotor 20 may be formed of a plurality of N poles and a plurality of S poles where an N pole and an S pole are alternately and repeatedly arranged along the rotational direction of rotor 20. Rotor 20 is formed of rotor body 21 having a magnetic force, and shaft 22 which penetrates the center of rotor body 21. Rotor body 21 is formed of: a rotor core (iron core) made of a magnetic material; and a plurality of permanent magnets fixed to the rotor core. The permanent magnets may be embedded in the rotor core, or may be mounted on a side surface of the rotor core. For example, rotor 20 may be formed such that a magnet insertion hole is formed in the rotor core, and the permanent magnet is embedded in the magnet insertion hole. The rotor core is formed of a laminated body formed by laminating a plurality of electromagnetic steel plates which are fixed to each other, for example. However, the present disclosure is not limited to such a configuration, and the rotor core may be a bulk body formed of a magnetic material. The permanent magnet is a bond magnet, a ceramic magnet, a metal magnet or the like, for example.

Shaft 22 of rotor 20 is a rotary shaft of rotor 20. That is, rotor 20 rotates using shaft 22 as a center of rotation. Shaft 22 is a rotation output shaft which rotates in an interlocking manner with the rotation of rotor body 21. Shaft 22 is formed of a metal rod, for example.

Rotor 20 is held by bearing units 70. Bearing units 70 support one end of shaft 22 of rotor 20 rotatably by bearings or the like.

As shown in FIG. 5 and FIG. 6, bobbin 30 is a stator-use bobbin mounted on stator core 10. Insertion hole 31 is formed in bobbin 30, and second segment core 12 which is an excitation part of stator core 10 is inserted into insertion hole 31. That is, bobbin 30 is mounted on second segment core 12.

Bobbin 30 is a coil bobbin around which coil 40 is wound. Bobbin 30 is formed of an insulating material such as a resin material. In this exemplary embodiment, bobbin 30 is formed of a thermoplastic resin, for example. However, a material for forming bobbin 30 is not limited to the thermoplastic resin provided that the material has an insulating property. For example, as the thermoplastic resin, poly butylene terephthalate, nylon, polyethylene terephthalate, an acrylonitrile butadiene styrene (ABS) resin or the like can be used.

Bobbin 30 is a hollow member having insertion hole 31 which forms an internal space. Flanges 32 are formed on opening ends 36 of insertion hole 31 of bobbin 30. In this exemplary embodiment, flange 32 is formed on each of opening ends 36 of insertion hole 31. In the description made hereinafter, for facilitating the understanding of the description, assume one of opening ends 36 as first opening end 36a, and assume the other of opening ends 36 positioned on a side opposite to first opening end 36a as second opening end 36b. As a matter of course, when the configuration adopted with respect to first opening end 36a is applied to second opening end 36b, substantially the same advantageous effect can be acquired. By forming flanges 32, it is possible to suppress the occurrence of collapse of winding of coil 40 which is wound around a cylindrical portion of bobbin 30.

Although the detailed configuration is described later, bobbin 30 further includes exposed portion 33 having exposed surface 33a which is exposed from resin mold 60. Exposed portion 33 is formed on each of opening ends 36 of insertion hole 31 of bobbin 30.

Coil 40 is a winding coil which is wound around bobbin 30 mounted on stator core 10. Coil 40 is a coil wire such as an enamel copper wire. By supplying electricity to coil 40, a magnetic flux is generated in stator core 10 where second segment core 12 forms a start point. A material for forming a core wire portion of coil 40 is not limited to a material containing copper as a main component, and may be a material containing a metal material other than copper such as aluminum as a main component, or may be a material containing a conductive material other than a metal material as a main component.

In this exemplary embodiment, a bobbin winding body is formed by winding single-phase coil 40 around bobbin 30. By inserting second segment core 12 in the bobbin winding body, an excitation structural body is formed. A pair of lead terminals 34 is mounted on a portion of bobbin 30. One end of coil 40 is connected to one of the pair of lead terminals 34. The other end of coil 40 is connected to the other of the pair of lead terminals 34.

Circuit board 50 is a printed wiring substrate on which pattern wiring made of a conductive material such as copper is formed in a predetermined shape, for example. On circuit board 50, an electronic part (not shown in the drawing) which controls the supply of electricity to coil 40 is mounted. One ends of lead terminals 34 of bobbin 30 and one ends of power supply wires 80 are connected to circuit board 50 by soldering, and connector 81 which holds power supply wires 80 is connected to circuit board 50. Power supply wires 80 are lead wires, for example. The other ends of power supply wires 80 are connected to an external power source. The external power source supplies electricity to circuit board 50 via power supply wires 80. External power source may be either an alternate current (AC) power source or a direct current (DC) power source.

As shown in FIG. 1 to FIG. 4, resin mold 60 is a resin molded body formed in a predetermined shape. Resin mold 60 is formed using an insulation resin material. To be more specific, as a material for forming resin mold 60, a thermosetting resin or a thermoplastic resin can be used. In this case, as the thermosetting resin, for example, an unsaturated-polyester-based resin, a phenol-based resin, an epoxy-based resin or the like can be used, for example. As the thermoplastic resin, for example, a polyethylene-terephthalate-based resin, a polybutylene-terephthalate-based resin or the like can be used.

Resin mold 60 covers bobbin 30, coil 40, and a portion of stator core 10. Resin mold 60 is fixed to stator core 10 in a state where resin mold 60 covers bobbin 30, coil 40, and the portion of stator core 10. Resin mold 60 further covers circuit board 50. By covering coil 40 and circuit board 50 by resin mold 60, it is possible to protect coil 40 and circuit board 50. Although coil 40 and circuit board 50 are completely covered by resin mold 60, stator core 10 is partially covered by resin mold 60. Although bobbin 30 is substantially wholly covered by resin mold 60, a portion of bobbin 30 is exposed from resin mold 60.

Figure 7:
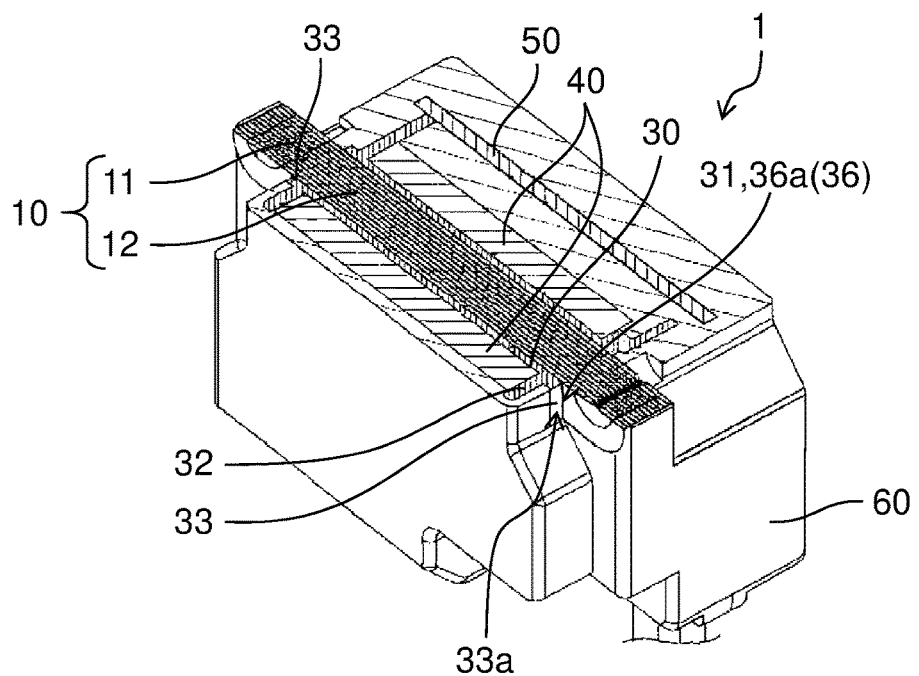
FIG. 7 is an enlarged cross-sectional perspective view showing a main part of the motor according to the first exemplary embodiment.
Figure 8:
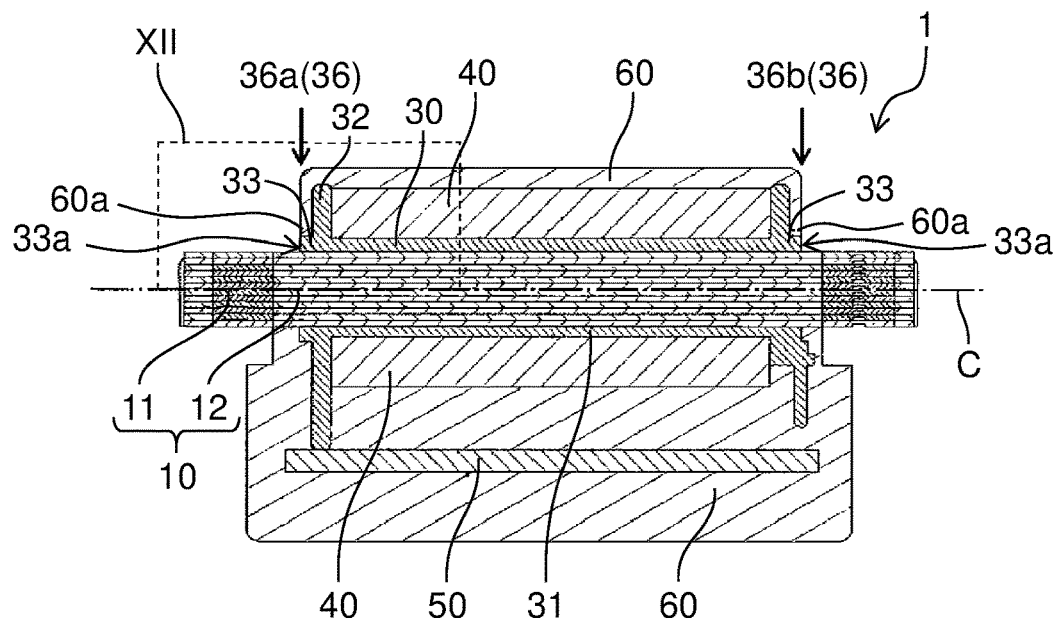
FIG. 8 is an enlarged cross-sectional view showing the main part of the motor according to the first exemplary embodiment.

Hereinafter, the relationship between such bobbin 30 and resin mold 60 is described in detail with reference to FIG. 7 and FIG. 8 as well as FIG. 1 to FIG. 6. FIG. 7 is an enlarged cross-sectional perspective view showing a main part of motor 1 according to the first exemplary embodiment. FIG. 8 is an enlarged cross-sectional view showing the main part of motor 1. Cross-sectional portions in FIG. 7 and FIG. 8 are equal to each other.

As shown in FIG. 7 and FIG. 8, exposed portion 33 having exposed surface 33a which is exposed from resin mold 60 is formed on opening ends 36 of insertion hole 31 of bobbin 30. In this exemplary embodiment, exposed portion 33 is formed on each of opening ends 36a, 36b on both sides of insertion hole 31.

On each of opening ends 36 of insertion hole 31 of bobbin 30, exposed portion 33 is positioned between stator core 10 and resin mold 60. To be more specific, exposed portion 33 is positioned between second segment core 12 and resin mold 60.

Exposed portion 33 is formed as a protruding portion (protrusion) formed by protruding a portion of bobbin 30. Exposed portion 33 protrudes outward from flange 32 along a direction of hole axis C of insertion hole 31 of bobbin 30. To be more specific, exposed portion 33 has the structure where the whole circumference of an edge portion of an opening of insertion hole 31 of bobbin 30 is protruded in a rectangular-shaped frame body mounted on an outer surface of flange 32.

Exposed surface 33a of exposed portion 33 is flush with a surface of portion 60a of resin mold 60 that surrounds exposed portion 33. Accordingly, exposed surface 33a of exposed portion 33 is a picture-frame-like flat surface that surrounds second segment core 12 having a rectangular shape in cross section.

In motor 1 having the above-mentioned configuration, when electricity is supplied to coil 40, a field current flows in coil 40 and second segment core 12 (excitation part) is excited, so that a magnetic flux is generated. A magnetic flux generated in second segment core 12 is transmitted to first segment core 11, so that a magnetic flux is generated on whole stator core 10. A rotation magnetic field having two poles, that is, an S pole and an N pole is generated in stator core 10. Rotor 20 rotates due to the rotation magnetic field of stator core 10. That is, a magnetic force generated by an interaction between a magnetic flux of stator core 10 and a magnetic flux generated from the permanent magnet of rotor 20 generates a torque for rotating rotor 20 thus rotating rotor 20.

Motor 1 having the above-mentioned configuration can be used in a blower as a fan motor. In this case, a blower can be formed by housing motor 1 where an impeller (rotation blade) is mounted on a distal end of shaft 22 of rotor 20 in a casing.

Such a blower can be used in electric equipment such as a refrigerator, an air conditioner or the like, for example. For example, in the refrigerator, the blower (indoor fan) is used for circulating cool air. The blower is used for cooling a compressor.

Figure 9:
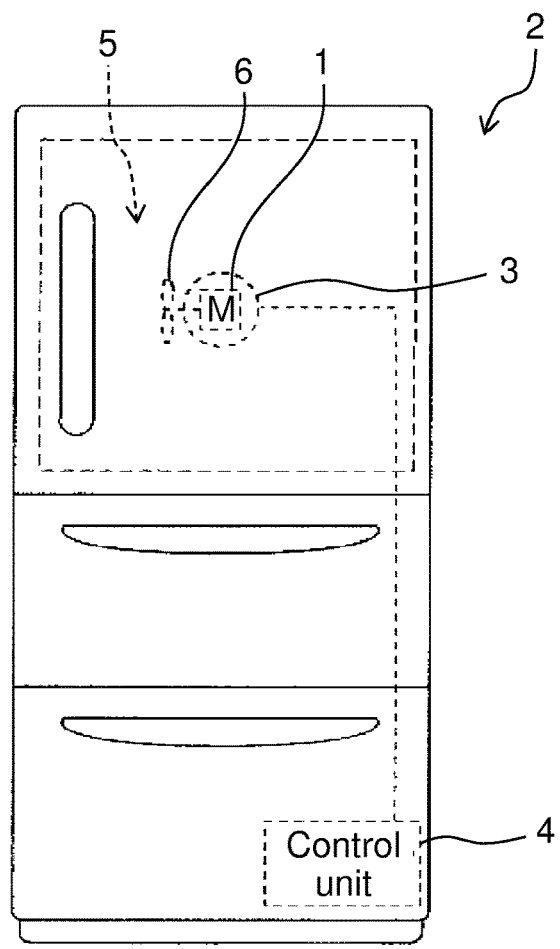
FIG. 9 is a schematic view showing one example of a refrigerator in which a blower using the motor according to the first exemplary embodiment is mounted.

Hereinafter, an application example of the blower which uses motor 1 is described with reference to FIG. 9. FIG. 9 is a schematic view showing one example of refrigerator 2 on which blower 3 using motor 1 according to the first exemplary embodiment is mounted.

As shown in FIG. 9, refrigerator 2 includes blower 3 which uses motor 1, controller 4 which controls blower 3, and refrigerating compartment 5. In refrigerator 2, blower 3 supplies cool air which is cooled by a cooler to refrigerating compartment 5 by using impeller 6. Controller 4 stops or starts the supply of air using blower 3 by controlling blower 3. Controller 4 may adjust an amount of air supplied using blower 3 by controlling blower 3. Particularly, controller 4 controls motor 1. Cool air may be supplied to freezing compartment in place of refrigerating compartment 5, or may be supplied to both refrigerating compartment 5 and the freezing compartment.

As described above, refrigerator 2 of this exemplary embodiment includes blower 3, controller 4 which controls blower 3, and refrigerating compartment 5 or the freezing compartment. Blower 3 supplies cool air to refrigerating compartment 5 or the freezing compartment.

Figure 10:
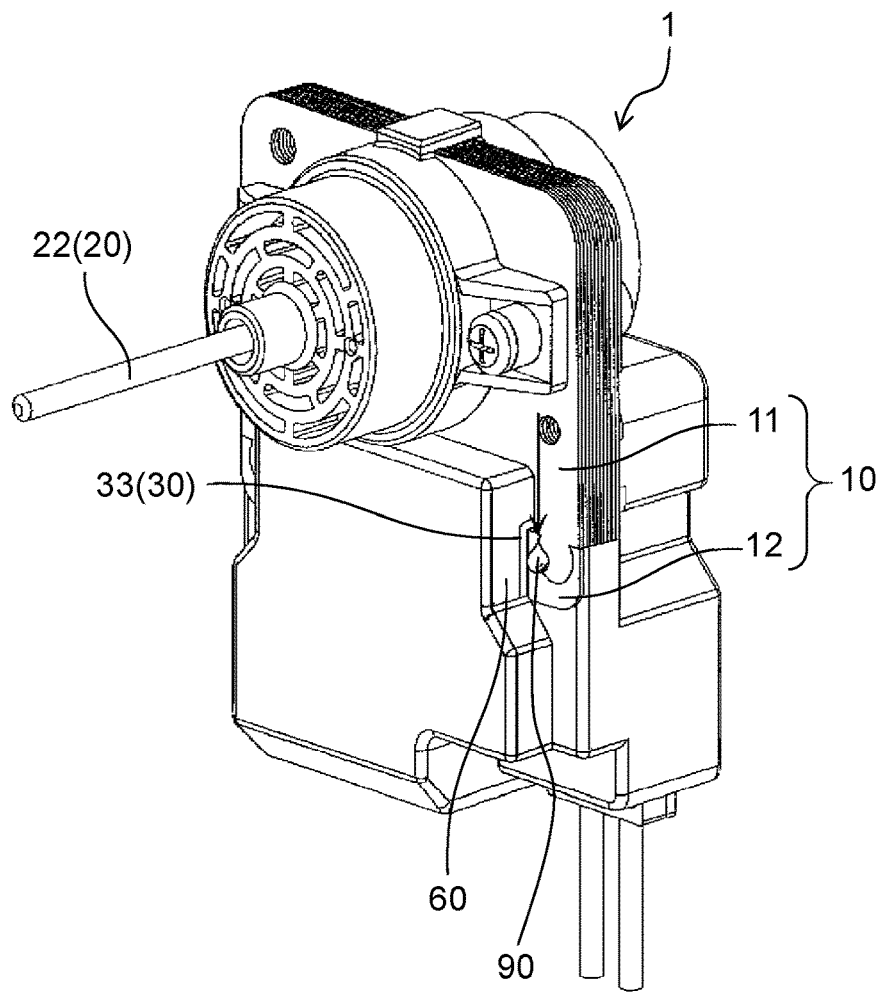
FIG. 10 is a view showing a state where water droplet adheres to a surface of the stator core of the motor according to the first exemplary embodiment.
Figure 11:
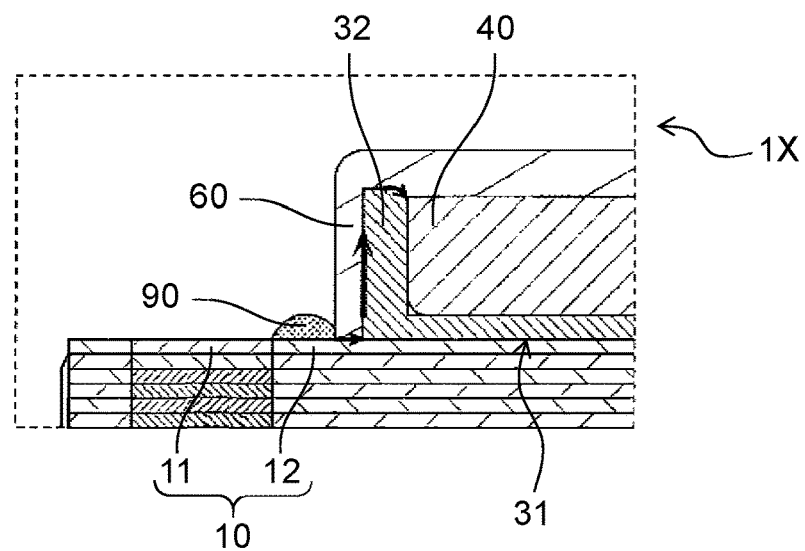
FIG. 11 is an enlarged cross-sectional view showing a main part of a motor according to a comparison example.
Figure 12:
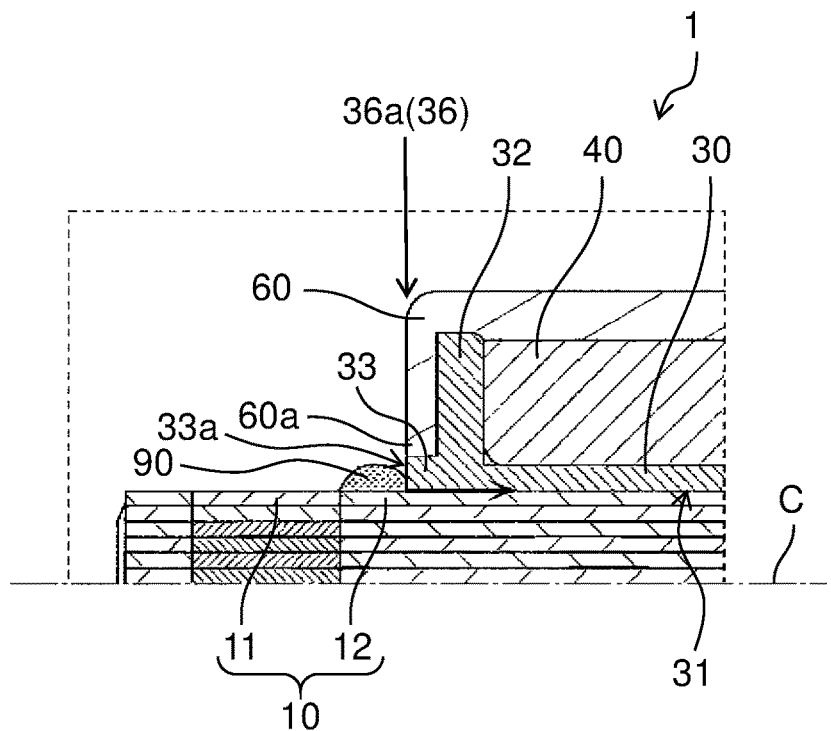
FIG. 12 is an enlarged cross-sectional view showing a main part of the motor in region XII surrounded by a broken line in FIG. 8.

Next, the manner of operation and advantageous effects of motor 1 according to the first exemplary embodiment are described with reference to FIG. 10 to FIG. 12 by comparing motor 1 according to the first exemplary embodiment with a motor of a comparison example. FIG. 10 is a view showing a state where water droplet 90 adheres to a surface of stator core 10 of motor 1 according to the first exemplary embodiment. FIG. 11 is an enlarged cross-sectional view showing a main part of motor 1X of the comparison example. FIG. 12 is an enlarged cross-sectional view showing a main part of motor 1 according to the first exemplary embodiment in region XII surrounded by a broken line in FIG. 8.

As shown in FIG. 10, motor 1 is disposed such that shaft 22 of rotor 20 is directed in a horizontal direction, for example. That is, a surface of stator core 10 is directed in a vertical direction.

As shown in FIG. 10, there is a case where water droplet 90 adheres to the surface of stator core 10 of motor 1. For example, a blower for supplying cool air cooled by a cooler to a refrigerating compartment is used in a refrigerator. In the refrigerator, at the time of removing frost on the cooler, or when a door of the refrigerator is open, driving of the motor is stopped so as to stop the supply of air by the blower. When the supply of air by the blower is stopped, a temperature around motor 1 is increased so that condensation occurs and, as shown in FIG. 10, water droplet 90 is formed on a surface of stator core 10.

Formed water droplet 90 slides and falls along the surface of stator core 10, and reaches a boundary between stator core 10 and resin mold 60. In this case, with respect to motor 1X according to the comparison example shown in FIG. 11, water intrudes into motor 1X through a boundary between stator core 10 and resin mold 60 as indicated by an arrow due to a capillary phenomenon. Further, there may be a case where intruded water advances along a boundary between flange 32 and resin mold 60 due to a capillary phenomenon, and reaches coil 40 which is covered by resin mold 60. As a result, the layer short of coil 40 occurs due to such water.

In contrast, with respect to motor 1 according to this exemplary embodiment, as shown in FIG. 12, exposed portion 33 which is exposed from resin mold 60 is disposed so as to be positioned between stator core 10 and resin mold 60. Accordingly, between stator core 10 and resin mold 60, there is no boundary between bobbin 30 and resin mold 60.

With such a configuration, even when water droplet 90 which adheres to the surface of stator core 10 slides and falls along the surface of stator core 10 and reaches a boundary between stator core 10 and bobbin 30, and intrudes into bobbin 30 due to a capillary phenomenon, as indicated by an arrow in FIG. 12, although water which intrudes into bobbin 30 intrudes into the motor along the boundary between stator core 10 and bobbin 30, the droplet does not reach coil 40.

That is, due to the formation of exposed portion 33, even when water droplet 90 adheres to the surface of stator core 10, it is possible to avoid the intrusion of water into the motor through the boundary between bobbin 30 and resin mold 60. With such a configuration, it is possible to suppress reaching of water to coil 40 along the boundary between bobbin 30 and resin mold 60. Accordingly, it is possible to suppress the occurrence of a layer short of coil 40.

As described above, motor 1 according to this exemplary embodiment includes: bobbin 30 having insertion hole 31; coil 40 wound around bobbin 30; stator core 10 having the excitation part which is inserted into insertion hole 31; rotor 20 disposed rotatably with respect to stator core 10; and resin mold 60 covering bobbin 30, coil 40 and stator core 10. On first opening end 36a of insertion hole 31, exposed portion 33 having exposed surface 33a which is exposed from resin mold 60 is formed. Exposed portion 33 is positioned between stator core 10 and resin mold 60.

With such a configuration, between stator core 10 and resin mold 60, no boundary is formed between resin mold 60 and bobbin 30. With such a configuration, even when water intrudes into the motor through the boundary between members existing between stator core 10 and resin mold 60, it is possible to suppress reaching of the water to coil 40. Accordingly, it is possible to suppress the occurrence of a layer short of coil 40. As a result, it is possible to realize highly reliable motor 1.

In this exemplary embodiment, bobbin 30 has flange 32 on first opening end 36a, and exposed portion 33 protrudes outward from flange 32 along hole axis C direction of insertion hole 31 of bobbin 30.

With such a configuration, a water intrusion path where water reaches coil 40 from the surface of resin mold 60 or exposed surface 33a can be elongated and hence, it is possible to further suppress reaching of water to coil 40.

In this exemplary embodiment, exposed surface 33a is flush with a surface of portion 60a of resin mold 60 that surrounds exposed portion 33.

With such a configuration, even when a water droplet slides and falls to an area around exposed portion 33 along the surface of stator core 10, the water droplet does not stay on exposed portion 33 and easily passes. With such a configuration, it is possible to further suppress the intrusion of water into the motor through the boundary between the members existing between stator core 10 and resin mold 60.

Further, since exposed surface 33a is flush with the surface of portion 60a of resin mold 60 that surrounds exposed portion 33, even when exposed portion 33 is formed on bobbin 30, it is possible to make exposed portion 33 inconspicuous.

In this exemplary embodiment, exposed surface 33a has an annular shape.

With such a configuration, exposed portion 33 can be formed so as to surround the whole circumference of first opening end 36a of insertion hole 31 of bobbin 30 and hence, it is possible to further suppress the intrusion of water through the boundary between the members existing between stator core 10 and resin mold 60.

In this exemplary embodiment, the motor includes circuit board 50 on which the electronic part for controlling the supply of electricity to coil 40 is mounted, and circuit board 50 is covered by resin mold 60.

With such a configuration, not only coil 40 but also circuit board 50 can be protected by resin mold 60. For example, by covering coil 40 and circuit board 50 by resin mold 60, coil 40 and circuit board 50 can be insulated and protected. Accordingly, deterioration of coil 40 and circuit board 50 attributed to moisture and oxygen in air can be suppressed.

In this exemplary embodiment, stator core 10 includes first segment core 11 and second segment core 12 connected to first segment core 11. First segment core 11 is formed so as to surround rotor 20. Second segment core 12 is the excitation part.

With such a configuration, when second segment core 12 (excitation part) is excited so that a magnetic flux is generated, the magnetic flux is transferred to first segment core 11, and a rotation magnetic field is generated in first segment core 11. With such a configuration, rotor 20 which is disposed so as to be surrounded by first segment core 11 can be rotated.

Second Exemplary Embodiment

Figure 13:
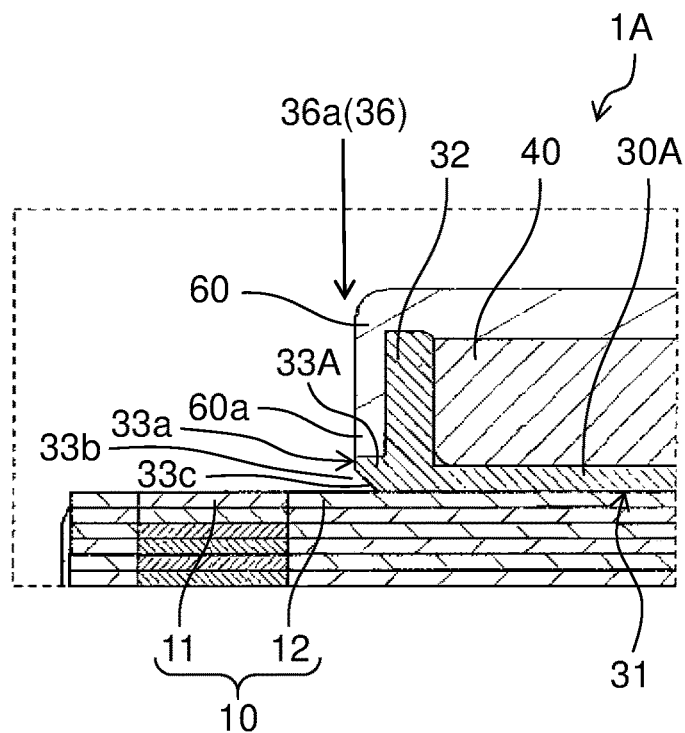
FIG. 13 is an enlarged cross-sectional view showing a main part of a motor according to a second exemplary embodiment.

Next, motor 1A according to a second exemplary embodiment is described with reference to FIG. 13. FIG. 13 is an enlarged cross-sectional view showing a main part of motor 1A according to the second exemplary embodiment.

In motor 1 of the first exemplary embodiment, exposed surface 33a of exposed portion 33 of bobbin 30 has a uniform flat surface. On the other hand, in motor 1A of this exemplary embodiment, as shown in FIG. 13, exposed surface 33a of exposed portion 33A of bobbin 30A includes a recessed surface.

To be more specific, as shown in FIG. 13, recess 33b which is recessed from a surface of resin mold 60 is formed on exposed portion 33A. In this exemplary embodiment, an inner surface of recess 33b of exposed portion 33A is formed in inclined surface 33c which forms a portion of exposed surface 33a. A distance between inclined surface 33c of recess 33b and a surface of stator core 10 decreases with distance from the surface of resin mold 60. For example, a cross-sectional shape of a portion of recess 33b which is recessed in a cutout shape is a right-angled triangle. Recess 33b can be formed by cutting out a corner portion of exposed portion 33 by chamfering the corner portion of exposed portion 33 in the first exemplary embodiment.

As described above, also in motor 1A of this exemplary embodiment, exposed portion 33A having exposed surface 33a exposed from resin mold 60 is formed on first opening end 36a of insertion hole 31 of bobbin 30A. Exposed portion 33A is positioned between stator core 10 and resin mold 60.

With such a configuration, at a boundary between stator core 10 and resin mold 60, a boundary between resin mold 60 and bobbin 30A does not exist. Accordingly, even when water intrudes into the motor from the boundary between members existing between stator core 10 and resin mold 60, it is possible to suppress reaching of water to coil 40. Accordingly, also in this exemplary embodiment, it is possible to suppress the occurrence of a layer short of coil 40. Accordingly, it is possible to realize highly reliable motor 1A.

In this exemplary embodiment, recess 33b which is recessed from a surface of resin mold 60 is formed on exposed portion 33A.

With such a configuration, a water droplet around first opening end 36a of insertion hole 31 of bobbin 30A can easily intrude between bobbin 30A and stator core 10 from recess 33b. As a result, a water droplet minimally stays on a peripheral portion where the boundary between resin mold 60 and bobbin 30A exists, that is, an area around first opening end 36a of insertion hole 31 of bobbin 30A. With such a configuration, it is possible to suppress intrusion of water into the motor through the boundary between resin mold 60 and bobbin 30A. Accordingly, it is possible to further suppress the occurrence of a layer short of coil 40. Accordingly, it is possible to realize more highly reliable motor 1A.

In this exemplary embodiment, an inner surface of recess 33b is inclined surface 33c, and the distance between inclined surface 33c and the surface of stator core 10 decreases with distance from the surface of resin mold 60.

With such a configuration, a water droplet around first opening end 36a of insertion hole 31 of bobbin 30A can be easily introduced to recess 33b. Accordingly, a water droplet can be easily drawn to an area between bobbin 30A and stator core 10. With such a configuration, it is possible to further suppress intrusion of water into the motor through the boundary between resin mold 60 and bobbin 30A. Accordingly, it is possible to further suppress the occurrence of a layer short of coil 40.

Third Exemplary Embodiment

Figure 14:
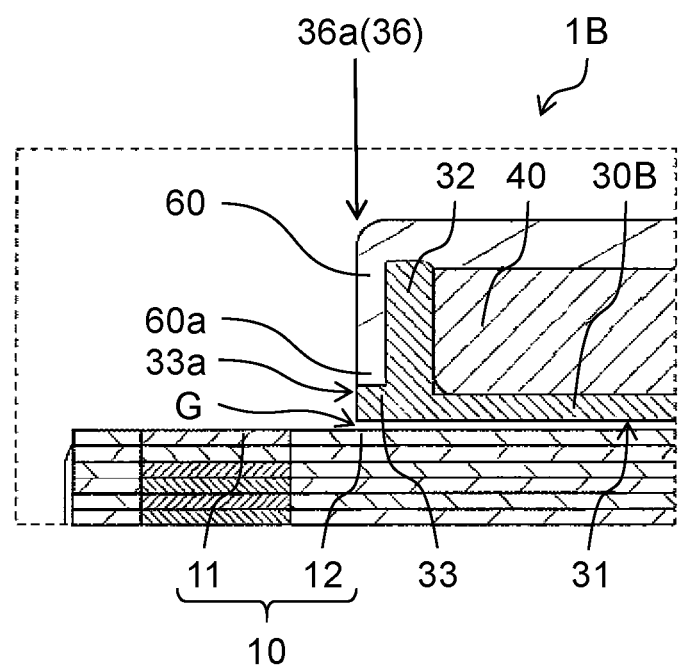
FIG. 14 is an enlarged cross-sectional view showing a main part of a motor according to a third exemplary embodiment.
Figure 15:
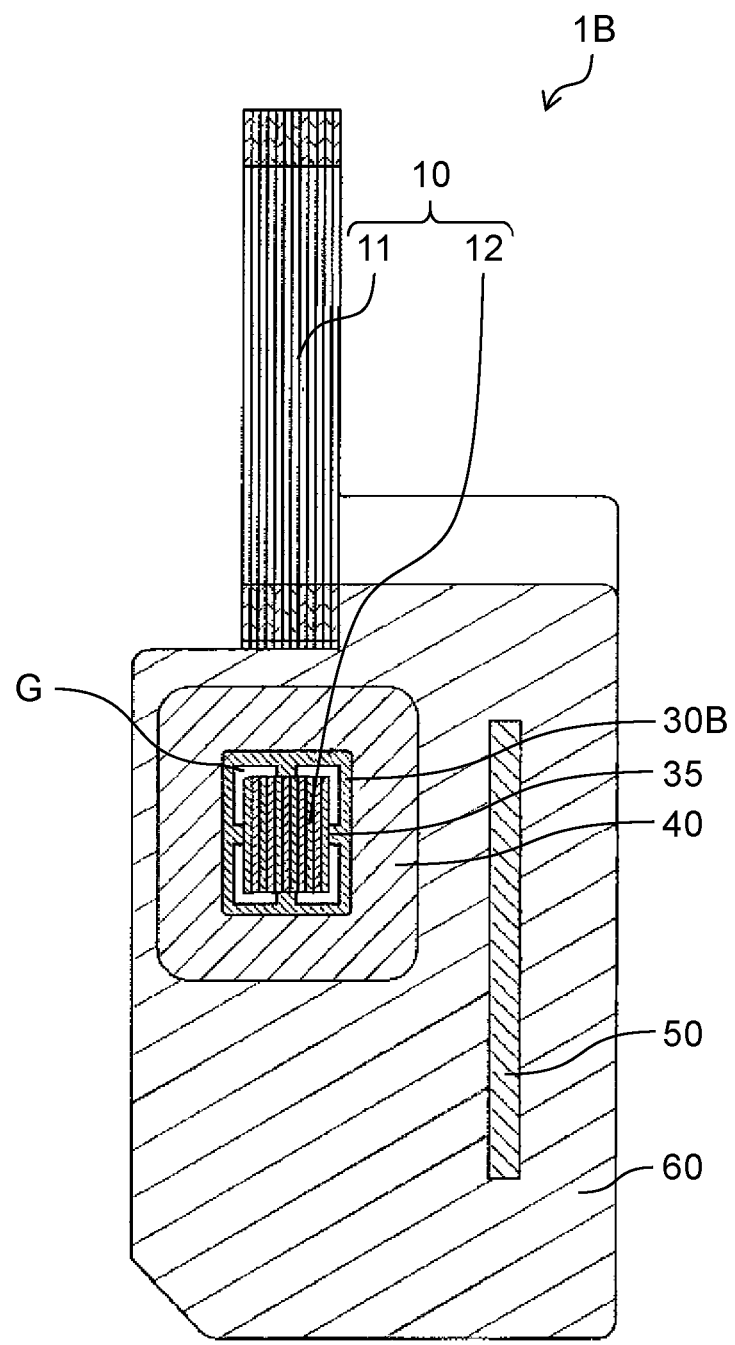
FIG. 15 is a side cross-sectional view of the motor according to the third exemplary embodiment.
Figure 16:
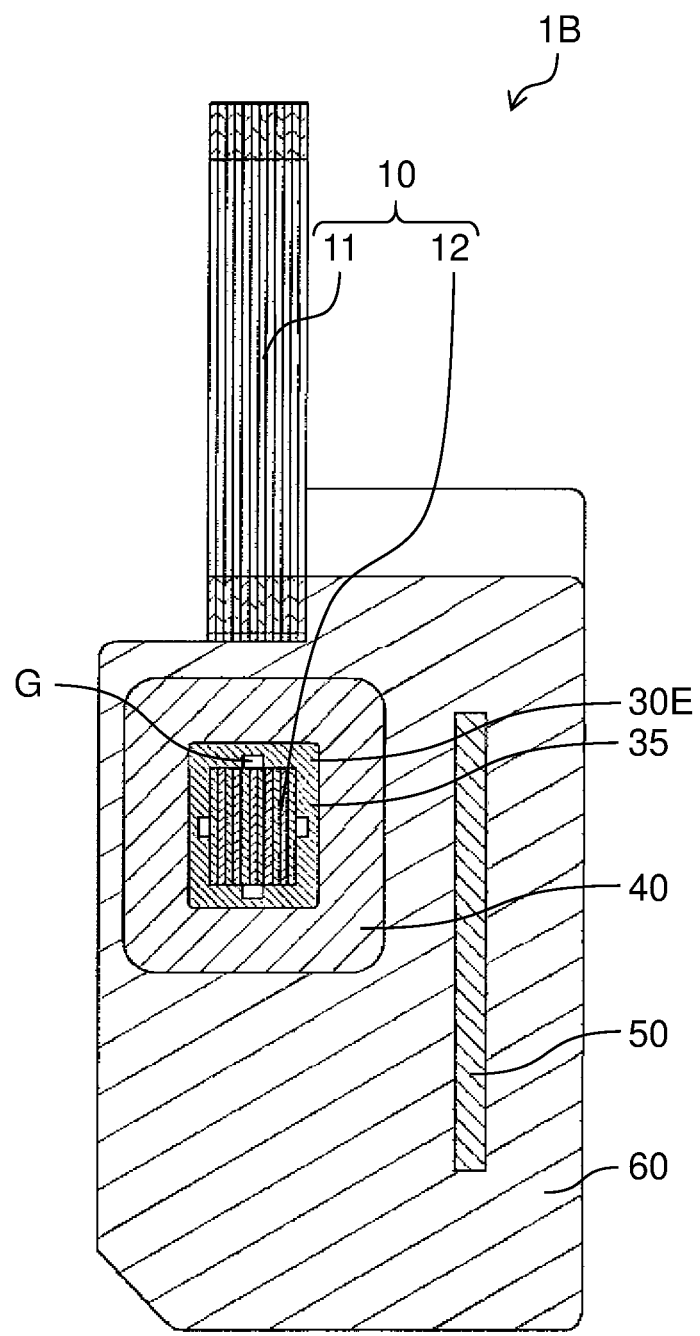
FIG. 16 is another side cross-sectional view of the motor according to the third exemplary embodiment.

Motor 1B according to a third exemplary embodiment is described with reference to FIG. 14 to FIG. 16. FIG. 14 is an enlarged cross-sectional view showing a main part of motor 1B according to the third exemplary embodiment. FIG. 15 is a side cross-sectional view of motor 1B. FIG. 16 is another side cross-sectional view of motor 1B.

In motor 1 of the first exemplary embodiment, the surface of stator core 10 and the inner surface of insertion hole 31 of bobbin 30 are brought into close contact with each other. However, in motor 1B of this exemplary embodiment, as shown in FIG. 14 to FIG. 16, gap G (groove) is formed between a surface of stator core 10 and an inner surface of insertion hole 31 of bobbin 30B. That is, gap G is formed between stator core 10 and bobbin 30B as a space layer.

As shown in FIG. 14, gap G extends from first opening end 36a of insertion hole 31 toward second opening end (36b) of insertion hole 31 disposed on a side opposite to first opening end 36a. In this exemplary embodiment, gap G is formed over the whole length of insertion hole 31.

In this exemplary embodiment, as shown in FIG. 15, protrusions 35 are formed on an inner side of bobbin 30B. Four protrusions 35 are formed so as to be brought into contact with four (upper, lower, left, and right) surfaces of second segment core 12. In this manner, by forming protrusions 35 on the inner side of bobbin 30B, bobbin 30B can be held on stator core 10, particularly, on second segment core 12 while maintaining gap G between stator core 10 and bobbin 30B in the circumferential direction.

In this exemplary embodiment, as shown in FIG. 16, gaps G1 are formed on an inner side of bobbin 30E. Four gaps G1 are formed so as to bring into contact with four (upper, lower, left, and right) surfaces which second segment core 12 has. In this manner, by providing gaps G1 on the inner side of bobbin 30E, bobbin 30E can be held on stator core 10, particularly, on second segment core 12 while maintaining gaps G1 between stator core 10 and bobbin 30E in the circumferential direction.

That is, as shown in FIG. 15, in a cross-sectional direction intersecting with hole axis C (cross-sectional direction shown in FIG. 15), an area where gap G and cross-sectional stator core 10 are brought into contact with each other, particularly, an area where gap G and second segment core 12 are brought into contact with each other is large. Accordingly, in this configuration, when a magnetic force is generated on stator core 10 so that stator core 10 is heated, water adhering to stator core 10 can be evaporated in an early stage.

On the other hand, as shown in FIG. 16, in a cross-sectional direction intersecting with hole axis C (cross-sectional direction shown in FIG. 16), areas where gaps G1 and cross-sectional stator core 10 are brought into contact with each other, particularly, areas where gaps G1 and second segment core 12 are brought into contact with each other are small. With this configuration, water which is introduced into gaps G1 can pass through gaps G1 in an early stage due to a capillary phenomenon or the like.

As described above, also in motor 1B of this exemplary embodiment, exposed portion 33 having exposed surface 33a exposed from resin mold 60 is formed on first opening end 36a of insertion hole 31 of bobbin 30B. Exposed portion 33 is positioned between stator core 10 and resin mold 60.

With such a configuration, at a boundary between stator core 10 and resin mold 60, a boundary between resin mold 60 and bobbin 30B does not exist. Accordingly, even when water intrudes into the motor through the boundary between members existing between stator core 10 and resin mold 60, it is possible to suppress reaching of water to coil 40. Accordingly, also in this exemplary embodiment, it is possible to suppress the occurrence of a layer short of coil 40. As a result, it is possible to realize highly reliable motor 1B.

In this exemplary embodiment, between the surface of stator core 10 and the inner surface of insertion hole 31, gap G, G1 which extends from first opening end 36a of opening ends 36 toward second opening end 36b of opening ends 36 positioned on a side of insertion hole 31 opposite to first opening end 36a is formed.

With such a configuration, a water droplet around first opening end 36a of insertion hole 31 of bobbin 30B, 30E can easily intrude between bobbin 30B, 30E and stator core 10 through gaps G, G1. As a result, a water droplet minimally stays on a peripheral portion where the boundary between resin mold 60 and bobbin 30B, 30E exists, that is, an area around first opening end 36a of insertion hole 31 of bobbin 30B, 30E. With such a configuration, it is possible to suppress intrusion of water into the motor through the boundary between resin mold 60 and bobbin 30B, 30E. Accordingly, it is possible to further suppress the occurrence of a layer short of coil 40. Accordingly, it is possible to realize more highly reliable motor 1B. In this exemplary embodiment, gaps G, G1 are formed over the whole length of insertion hole 31.

With such a configuration, it is possible to suppress water intruded into gaps G, G1 from staying in gaps G, G1. Accordingly, it is possible to realize more highly reliable motor 1B.

(Modification)

Although the motor, the blower, the refrigerator and the like according to this disclosure have been described heretofore with reference to the exemplary embodiments, the present disclosure is not limited to the above-mentioned exemplary embodiments.

Figure 17:
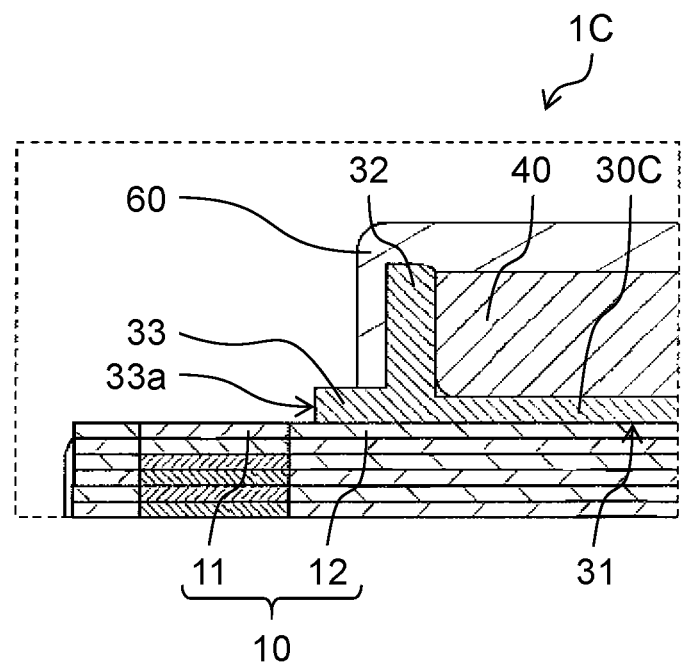
FIG. 17 is an enlarged cross-sectional view showing a main part of a motor according to a modification.
Figure 18:
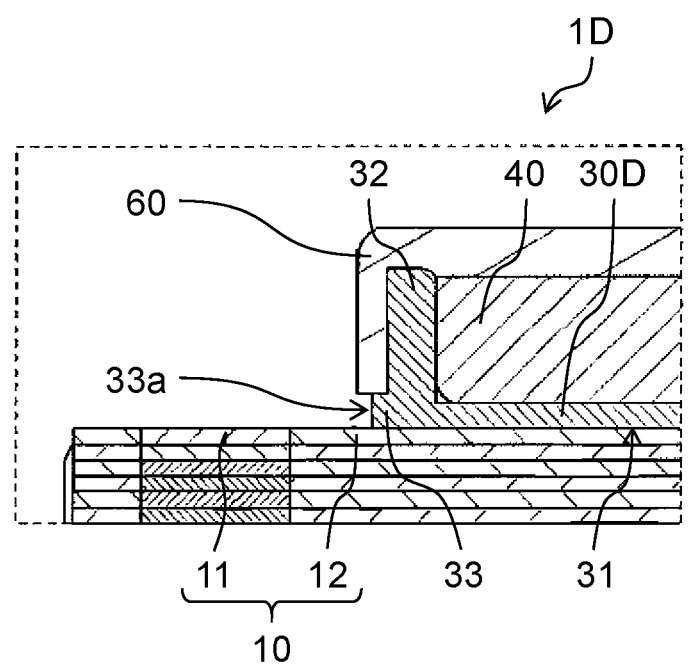
FIG. 18 is an enlarged cross-sectional view showing a main part of a motor according to another modification.
Figure 19:
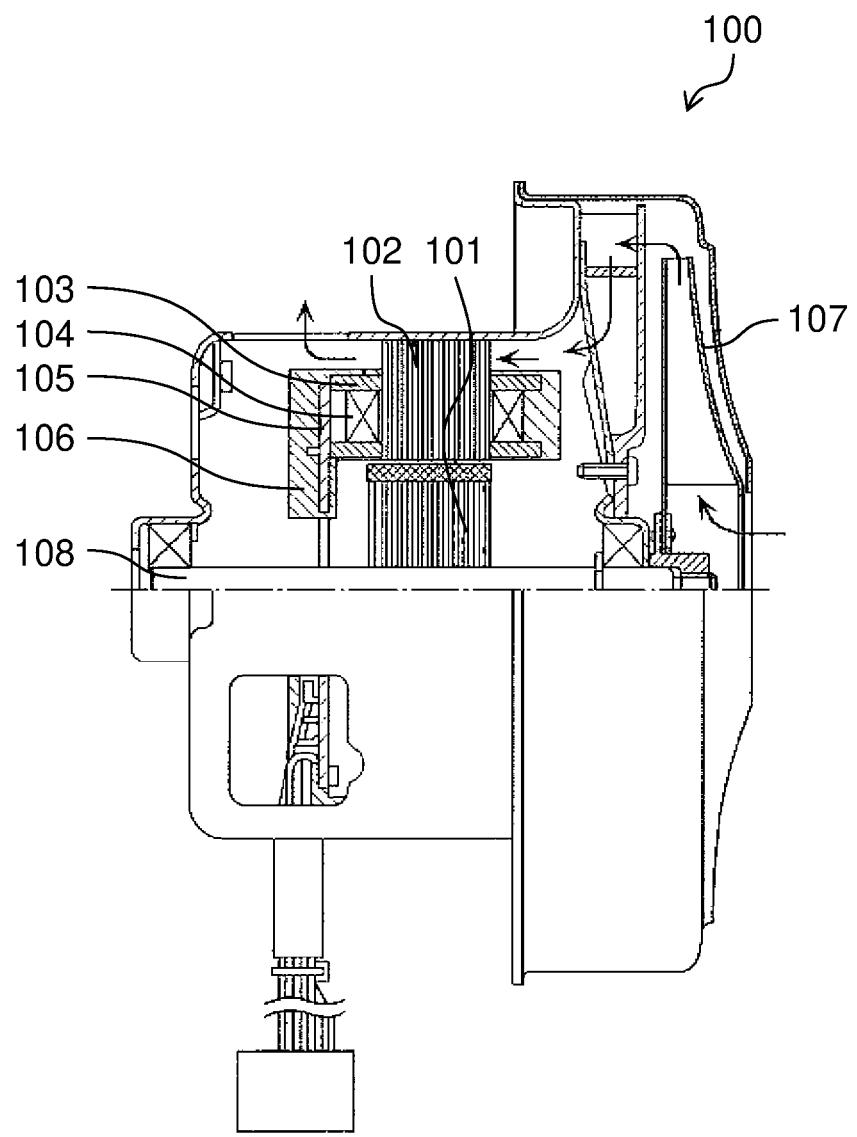
FIG. 19 is a cross-sectional view of a conventional blower disclosed in PTL 1.

For example, in the first to third exemplary embodiments, exposed surface 33a of exposed portion 33 formed on bobbin 30 is flush with the surface of a portion of resin mold 60 surrounding the exposed portion. However, the present disclosure is not limited to such a configuration, and exposed surface 33a of exposed portion 33 may be positioned outside the surface of resin mold 60 as shown in FIG. 17. Further, as shown in FIG. 18, exposed surface 33a may be positioned inside the surface of resin mold 60. FIG. 17 is an enlarged cross-sectional view showing a main part of a motor according to a modification. FIG. 18 is an enlarged cross-sectional view showing a main part of a motor according to another modification. Bobbin 30C of motor 1C shown in FIG. 17 is formed such that exposed portion 33 protrudes from a surface of resin mold 60. That is, in FIG. 17, compared to the configuration shown in FIG. 12, a protruding amount (height) of exposed portion 33 (protrusion) is large.

Bobbin 30D of motor 1D shown in FIG. 18 is formed such that exposed portion 33 is recessed from the surface of resin mold 60.

In the first to third exemplary embodiments, exposed surface 33a of exposed portion 33 is formed in an annular shape. However, the present disclosure is not limited to such a configuration. Provided that exposed portion 33 is formed such that at least a portion of bobbin 30 is exposed on the boundary between stator core 10 and bobbin 30, it is possible to suppress the intrusion of a water droplet adhering to the surface of stator core 10 into bobbin 30.

The motors according to the first to third exemplary embodiments are used in the cooling blower. However, the application of the motors is not limited to the cooling blower, and the motors can be used in various electric equipment.

In addition, the present disclosure includes modifications which those skilled in the art can obtain by adding changes to the first to third exemplary embodiments described above or modifications implemented by freely combining constitutional elements and functions described in the first to third exemplary embodiments without departing from the gist of the present disclosure.

The technique of the present disclosure can be used in various electric equipment such as a motor, a blower, a refrigerator and the like. Particularly, the technique of the present disclosure is useful for a motor or the like which is used in an environment where a water droplet easily adheres to a surface of a stator core.

The invention claimed is:

1. A motor comprising:
   a bobbin having an insertion hole having a first opening end and a second opening end positioned on a side opposite to the first opening end along an extending direction of the bobbin, a first flange disposed at the first opening end, a first exposed portion protruding from the first flange in the extending direction of the bobbin, a second flange disposed at the second opening end and a second exposed portion protruding from the second flange in the extending direction of the bobbin;

a coil wound around the bobbin;
a stator core having an excitation part that is inserted into the insertion hole;
a rotor disposed rotatably with respect to the stator core; and
a resin mold covering the bobbin, the coil, and the stator core, wherein:
the resin mold covers the first flange and the second flange,
the first exposed portion and the second exposed portion are formed around whole circumferences of an edge portion of the first opening of the first insertion hole and the second opening of the second insertion hole, respectively,
the first exposed portion of the bobbin has a first exposed surface that is exposed from the resin mold formed on the first opening end and a second exposed surface that is exposed from the resin mold formed on the second opening end,
the first exposed portion is positioned between the stator core and the resin mold, the first exposed surface being disposed partially around the first opening end of the insertion hole, and
the second exposed portion is positioned between the stator core and the resin mold, the second exposed surface being disposed partially around the second opening end of the insertion hole.

2. The motor according to claim 1, wherein a recess that is recessed from a surface of the resin mold is formed in the first exposed portion.

3. The motor according to claim 2, wherein:
the recess is an inclined surface, and
the inclined surface and a surface of the stator core forms a V-shape.

4. The motor according to claim 3, wherein a gap that extends from the first opening end toward a second opening end of the insertion hole opposite to the first opening end is formed between a surface of the stator core and an inner surface of the insertion hole.

5. The motor according to claim 4, wherein the gap is formed over a whole length of the insertion hole.

6. The motor according to claim 2, wherein a gap that extends from the first opening end toward a second opening end of the insertion hole opposite to the first opening end is formed between a surface of the stator core and an inner surface of the insertion hole.

7. The motor according to claim 6, wherein the gap is formed over a whole length of the insertion hole.

8. The motor according to claim 1, wherein
a gap that extends from the first opening end toward a second opening end of the insertion hole opposite to the first opening end is formed between a surface of the stator core and an inner surface of the insertion hole.

9. The motor according to claim 8, wherein the gap is formed over a whole length of the insertion hole.

10. The motor according to claim 1, wherein
the first exposed surface is flush with a surface of a portion of the resin mold, the portion partially surrounding and contacting a periphery of the first exposed portion.

11. The motor according to claim 1, further comprising a circuit board mounted with an electronic part for controlling a supply of electricity to the coil, and
the circuit board is covered by the resin mold.

12. The motor according to claim 1, wherein the stator core includes: a first segment core; and a second segment core that is connected to the first segment core,
the first segment core is formed so as to surround the rotor, and
the second segment core is the excitation part.

13. A blower comprising:
the motor according to claim 1; and
an impeller mounted on a shaft of the rotor.

14. A refrigerator comprising:
the blower according to claim 13;
a control unit for controlling the blower; and
a refrigerating compartment or a freezing compartment, wherein
the blower is configured to supply cool air to the refrigerating compartment or the freezing compartment.

15. The motor according to claim 1, wherein:
the first flange has a first surface contacting the coil and a second surface opposite to the first surface,
the first exposed portion protrudes from the second surface of the first flange, and
the resin mold covers the second surface of the first flange and a part of the first exposed portion.

16. The motor according to claim 15, wherein:
the second flange has a first surface contacting the coil and a second surface opposite to the first surface,
the second exposed portion protrudes from the second surface of the second flange, and
the resin mold covers the second surface of the second flange and a part of the second exposed portion.

17. The motor according to claim 1, wherein:
the first exposed portion is a rectangular-shaped frame body having four sides and the first opening end has a rectangular-shaped opening having four sides, and
at least two sides of the rectangular-shaped frame body of the first exposed portion are disposed on corresponding two sides of the rectangular-shaped opening of the first opening end.

* * * * *